(12) United States Patent
Crowther et al.

(10) Patent No.: US 10,538,384 B2
(45) Date of Patent: Jan. 21, 2020

(54) FLUID RETAINING STRUCTURE

(71) Applicants: Sensor (UK) Ltd., Manchester (GB); Carlow Precast Manufacturing, Kilnock (IE); Stantec UK Limited, London (GB)

(72) Inventors: Jon Crowther, Manchester (GB); Colin Smith, London (GB)

(73) Assignees: SENSOR (UK) LTD, Lancashire (GB); CARLOW PRECAST MANUFACTURING ULC, Kilnock (IE); MWH UK LTD, London (GB)

( * ) Notice: Subject to any disclaimer, the term of this patent is extended or adjusted under 35 U.S.C. 154(b) by 0 days.

(21) Appl. No.: 15/735,736

(22) PCT Filed: Jun. 15, 2016

(86) PCT No.: PCT/GB2016/051775
§ 371 (c)(1),
(2) Date: Dec. 12, 2017

(87) PCT Pub. No.: WO2016/203222
PCT Pub. Date: Dec. 22, 2016

(65) Prior Publication Data
US 2018/0178977 A1    Jun. 28, 2018

(30) Foreign Application Priority Data
Jun. 15, 2016   (GB) .................................. 1510442.5

(51) Int. Cl.
*B65D 90/513*  (2019.01)
*E03F 11/00*   (2006.01)
(Continued)

(52) U.S. Cl.
CPC ............ *B65D 90/513* (2019.02); *E03B 11/12* (2013.01); *E03B 11/14* (2013.01); *E03F 11/00* (2013.01);
(Continued)

(58) Field of Classification Search
CPC ............................... B65D 90/508; E04H 7/18; E04C 2/28; E04B 1/04; E04B 1/20; E04B 2103/02;
(Continued)

(56) References Cited

U.S. PATENT DOCUMENTS 3,408,784 A * 11/1968 Crowley ................... E04H 7/20
                                                      52/223.3
3,633,328 A *  1/1972 Closner .................... E04H 7/20
                                                      52/169.1
(Continued)

FOREIGN PATENT DOCUMENTS

DE         2060629 A1      7/1971
DE        10318982 A1     11/2004
(Continued)

*Primary Examiner* — Joshua K Ihezie
(74) *Attorney, Agent, or Firm* — Potomac Law Group, PLLC; Grady L. White

(57) ABSTRACT

A fluid retaining structure comprising an electronic leak detection and location, ELDL, system, wherein the fluid retaining structure comprises inner and outer liners (18, 16) that form electrical isolation layers of the ELDL system, wherein an electrically conductive signal layer (10, 12) of the ELDL system provides structural rigidity to the fluid retaining structure.

17 Claims, 15 Drawing Sheets

(51) Int. Cl.
*E03B 11/12* (2006.01)
*E03B 11/14* (2006.01)
*E04B 1/04* (2006.01)
*E04B 1/20* (2006.01)
*E04C 2/28* (2006.01)
*E04H 7/18* (2006.01)

(52) U.S. Cl.
CPC .................. *E04B 1/04* (2013.01); *E04B 1/20* (2013.01); *E04C 2/28* (2013.01); *E04H 7/18* (2013.01); *E04B 2103/02* (2013.01)

(58) Field of Classification Search
CPC .......... E03B 11/14; E03B 11/12; E03F 11/00; Y02A 20/104
USPC ............................................. 52/169.7, 169.14
See application file for complete search history.

(56) References Cited

U.S. PATENT DOCUMENTS

| | | | | | |
|---|---|---|---|---|---|
| 4,961,293 | A | * | 10/1990 | House | B65D 88/76 52/21 |
| 5,081,761 | A | * | 1/1992 | Rinehart | B65D 90/022 220/560.03 |
| 5,114,274 | A | * | 5/1992 | Heiler, Jr. | B09B 1/00 405/129.7 |
| 5,184,504 | A | * | 2/1993 | Spring | G01M 3/32 73/49.2 |
| 5,661,406 | A | * | 8/1997 | Daily | G01M 3/16 324/557 |
| 6,206,226 | B1 | * | 3/2001 | Coates | B65D 90/046 220/565 |
| 6,331,778 | B1 | * | 12/2001 | Daily | G01M 3/16 324/512 |
| 6,606,836 | B2 | * | 8/2003 | Miller | B28B 7/0008 405/129.55 |
| 8,113,740 | B2 | * | 2/2012 | Boulton | E03B 11/14 405/36 |
| 8,770,890 | B2 | * | 7/2014 | May | E03F 1/002 405/126 |
| 9,624,671 | B1 | * | 4/2017 | Gunness | E04D 13/006 |
| 9,771,703 | B1 | * | 9/2017 | Golding, Jr. | B32B 5/022 |
| 2001/0022302 | A1 | * | 9/2001 | Dunn | B65D 90/501 220/62.11 |
| 2004/0200997 | A1 | * | 10/2004 | Soundararajan | C08G 18/2018 252/478 |
| 2007/0181197 | A1 | * | 8/2007 | Krichten | E03F 1/005 137/833 |
| 2008/0246621 | A1 | * | 10/2008 | Wu | G01M 3/16 340/605 |
| 2010/0154319 | A1 | * | 6/2010 | Shockley | E04H 7/18 52/82 |
| 2011/0061336 | A1 | * | 3/2011 | Thomas | B66C 23/342 52/745.19 |
| 2012/0201603 | A1 | * | 8/2012 | Boulton | E03B 11/14 405/36 |
| 2014/0144916 | A1 | * | 5/2014 | Jeffries | B65D 90/501 220/565 |
| 2014/0208553 | A1 | * | 7/2014 | Schwab | E04H 13/00 27/7 |
| 2015/0102036 | A1 | * | 4/2015 | Hyde | F17C 3/00 220/560.04 |
| 2016/0099085 | A1 | * | 4/2016 | Singh | G21C 19/07 376/299 |

FOREIGN PATENT DOCUMENTS

| | | |
|---|---|---|
| DE | 102010031610 A1 | 1/2012 |
| EP | 0962754 B1 | 11/2002 |
| WO | 2016001639 A1 | 1/2016 |

\* cited by examiner

FLUID RETAINING STRUCTURE

This invention relates to a fluid retaining structure, a leak detection system for a fluid retaining structure and methods of constructing the same.

BACKGROUND

Within the construction industry there has been a drive for many years to increase offsite manufacturing whilst reducing the amount of site work required as a result. This allows for reductions in site costs and reductions in the risk of injury to site workers on multi-trade sites. This has led to the concept of using prefabricated structural elements that by their nature are then difficult to waterproof due to the arrangement of joints between sections and the potential for differential movement causing connections to become unsound at some future point.

It is an object of the present invention to address the abovementioned disadvantages.

In order to address the disadvantages identified above, the approach has been developed to produce a composite tank incorporating movement tolerant lining materials with prefabricated structural elements. This combination means that all waterproofing requirements for the structural element design including crack width calculations, movement and general waterproofness can be omitted as design considerations in relation to those structural elements. Furthermore the introduction of electronic leak detection and location systems into the design allows any future leakage both in or out of the fluid retaining structure to be detected, located and repaired without wholesale replacement of the waterproofing layers.

According to the present invention there is provided an apparatus and method as set forth in the appended claims. Other features of the invention will be apparent from the dependent claims, and the description which follows.

According to a first aspect of the present invention, there is provided a fluid retaining structure having an electronic leak detection and location, ELDL, system, wherein the fluid retaining structure comprises inner and outer liners that form electrical isolation layers of the ELDL system, wherein an electrically conductive signal layer of the ELDL system provides structural rigidity to the fluid retaining structure.

Preferably, the electrical isolation layers are adapted to perform fluid retention and ingress prevention functions of the fluid retaining structure.

Preferably the liners are waterproofing liners.

The electrically conductive signal layer may be made of a concrete-based material. The electrically conductive signal layer may be reinforced with a metal, such as steel or other materials that enhance structural capacity of the concrete. The electrically conductive signal layer may be reinforced with a plurality of metal or other elements that are in electrical contact with each other.

Advantageously the concrete provides both an electrically conducting layer for the ELDL system and the structural integrity to support the fluid retaining structure whilst the electrical isolation layers retain fluid therein and prevent fluid from outside entering the structure.

A floor section of the outer liner may be located beneath a floor section of the electrically conductive signal layer. The floor section of the electrically conductive signal layer may be a steel reinforced concrete floor.

Uniquely the floor section of the electrically conductive signal layer of the fluid retaining structure may be entirely, or substantially, constructed of interlocking precast concrete units that may or may not require tying together with structural ties, equally for the purposes of the ELDL system the floor section of the electrically conductive signal layer could be in situ cast concrete.

Wall sections of the outer liner are preferably continuous with the floor section thereof. The wall sections of the outer liner are preferably wrapped around wall sections of the electrically conductive signal layer.

The wall sections of the electrically conductive signal layer may be steel reinforced concrete wall sections and may be the structural element of fluid retaining walls. The wall sections of the electrically conductive signal layer may be electrically isolated from each other. One wall section of the electrically conductive signal layer may be electrically isolated from an adjacent wall section of the electrically conductive signal layer. The electrical isolation is to sufficient allow signals from adjacent wall sections of the electrically conductive signal layer to be distinguished from each other.

At least one of the wall sections of the electrically conductive signal layer may incorporate cavities, preferably introduced during manufacture. The cavities may be side cavities that preferably extend inwards from side edges of the wall sections of the electrically conductive signal layer. The cavities may be longitudinally tapered. The cavities may be rectilinear, preferably square, in cross-section. The cavities may have the advantageous effect of reducing an amount of concrete used in the wall sections. The wall sections of the electrically conductive signal layer may advantageously incorporate gaps therebetween to allow for the drainage of a leachate. Electrical connections to the control means of the ELDL system may also pass between the wall sections.

The wall sections of the outer liner preferably extend and/or wrap over an upper edge or wall plate of the wall section of the electrically conductive signal layer.

The outer liner is preferably welded to the inner liner such that it passes through a wall roof joint of the electrically conductive signal layer. However there are other configurations possible where the inner liner is not connected to the outer liner and instead remains separate.

The fluid retaining structure may include internal column supports. The internal column supports may be located inside cover elements of the inner liner. The cover elements may be sleeves placed over the column supports. The cover elements may be joined to or part of a floor section of the inner liner. The floor section of the inner liner is preferably located over a floor section of the fluid retaining structure. The cover elements may be welded to the floor section of the inner liner.

The fluid retaining structure may include a roof. The roof may be supported by the internal column supports and the wall sections. The roof may or may not also be an element of the electrically conductive signal layer.

The outer liner may be wrapped over the roof, whereupon it would be necessary to line the soffit of the roof with the inner liner in the same way as the floor. Alternatively the roof liner may have a dual liner system with conductive medium and sensors between where the lower and upper liners would preferably be welded to the outer liner below the wall roof joint, forming a separate ELDL zone.

The fluid retaining structure preferably presents only the inner liner to any contents of the fluid retaining structure. The inner liner preferably prevents any fluid held in the fluid retaining structure from contacting the electrically conductive signal layer in the absence of a leak.

Sensors of the ELDL system are preferably located between the inner and outer liners. The sensors may be located in electrical contact with the electrically conductive signal layer. The sensors may be located in openings in the electrically conductive signal layer.

Wiring of the ELDL system preferably exits the electrically conductive signal layer at an upper section of the fluid retaining structure.

The inner and/or outer liners may be made of sections of non-electrically conducting liner material that are secured together, preferably by welding.

According to another aspect of the present invention there is provided a two layer electronic leak detection and location, ELDL, system comprising inner and outer liners and an electrically conductive signal layer comprising sensors, wherein the electrically conductive signal layer provides structural rigidity to allow the ELDL system.

Preferably, the electrically conductive signal layer provides the electrical conductivity between the two liners necessary to allow the ELDL system to function.

The ELDL system may include control means and a plurality of sensors, wherein the sensors are electrically isolated from each other and in electrical communication to the control means, wherein the sensors have a sheet form. In this case, each sensor may be a wall section of the electrically conductive signal layer.

The sensors may be block sensors or tile sensors.

The sensors may be physically connected to each other, albeit electrically isolated from each other. The sensors may be physically joined by a non-conducting material, which may form a welded joint between sensors.

The sensors may be spaced from each other to leave a gap therebetween, which gap is electrically non-conducting.

The electrical communication with the control means may be a wired or wireless communication.

According to a another aspect of the present invention, there is provided a method of retaining a fluid in a structure, the structure having an electronic leak detection and location, ELDL, system, wherein the fluid is retained by an inner liner that forms an electrical isolation layer of the ELDL system, wherein an electrically conductive signal layer of the ELDL system provides structural rigidity to the fluid retaining structure.

According to another aspect of the present invention, there is provided kit of parts for a fluid retaining structure having an electronic leak detection and location, ELDL, system, wherein the fluid retaining structure comprises inner and outer liners for forming electrical isolation layers of the ELDL system, wherein an electrically conductive signal layer of the ELDL system provides structural rigidity to the fluid retaining structure.

According to another aspect of the present invention, there is provided a liner for a fluid retaining structure having an electronic leak detection and location, ELDL, system, wherein the liner is adapted to form an electrical isolation layer of the ELDL system.

According to another aspect of the present invention, there is provided a fluid retaining structure adapted to incorporate an electronic leak detection and location, ELDL, system, wherein structural elements of the fluid retaining structure are adapted to form an electrically conductive signal layer of the ELDL system.

The references to service reservoir herein should be interpreted to include waste water tanks also.

All of the features described herein may be combined with any of the above aspects, in any combination.

For a better understanding of the invention, and to show how embodiments of the same may be carried into effect, reference will now be made, by way of example, to the accompanying diagrammatic drawings in which.

Figure 17A:
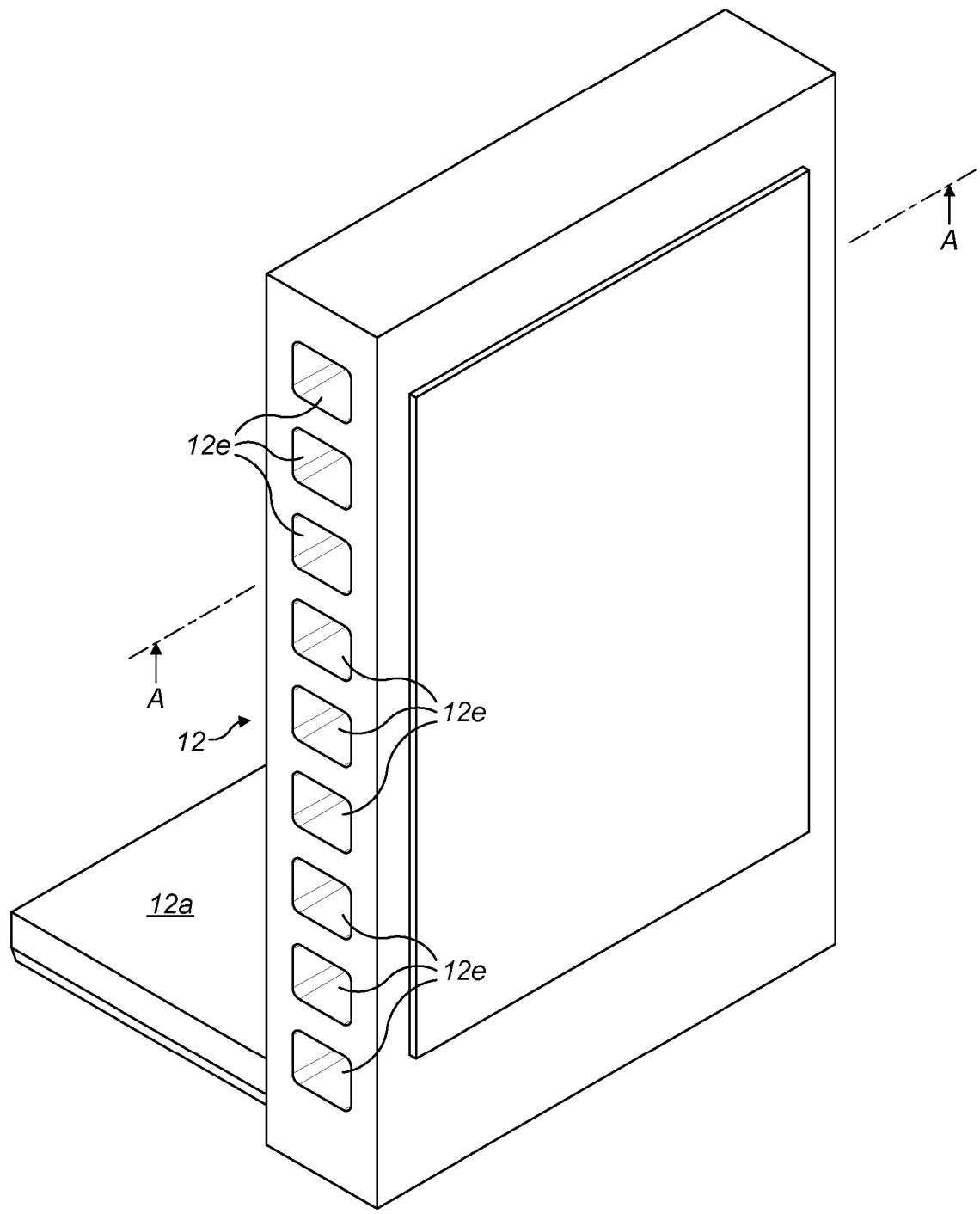
Figure 17B:
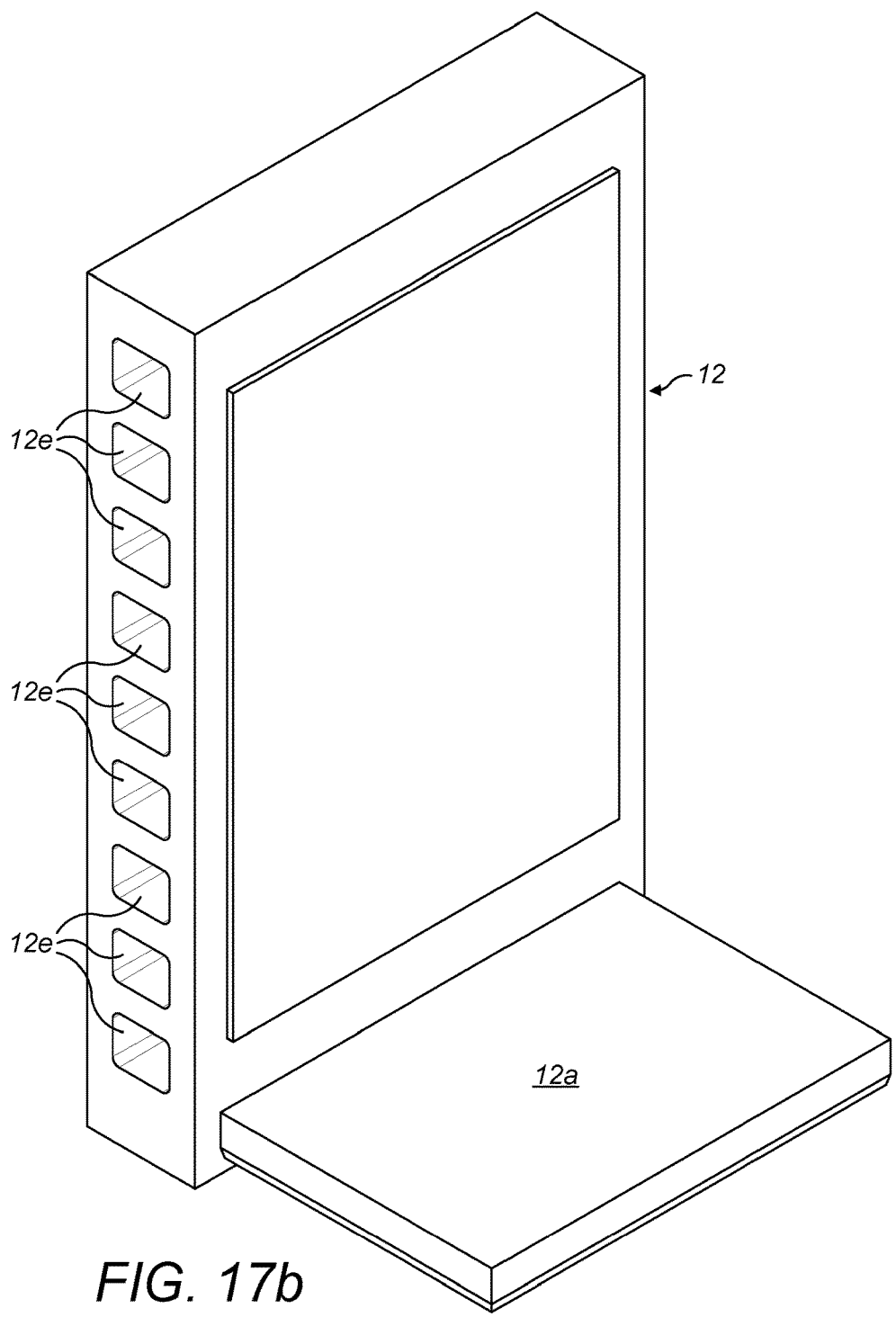
Figure 17C:
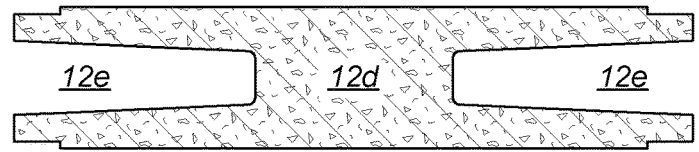

FIGS. 17a-c show schematic front, rear and cross-sectional views of an embodiment of wall section for the service reservoir.

The fluid retaining structures described herein are exemplified with respect to a service reservoir for drinking water as an example. Other fluid retaining structures are eminently suited to the invention, including slurry tanks, waste water reservoirs, water treatment reservoirs and generally tanks or retaining structures to keep fluids isolated from a surrounding environment. In addition it is conceived that the fluid retaining structure might also be used to create dry storage environment or dry underground accommodation where watertightness of the structure is paramount and monitorable, for example underground data centres or dry storage of contaminated wastes, such as nuclear wastes.

Figure 15:
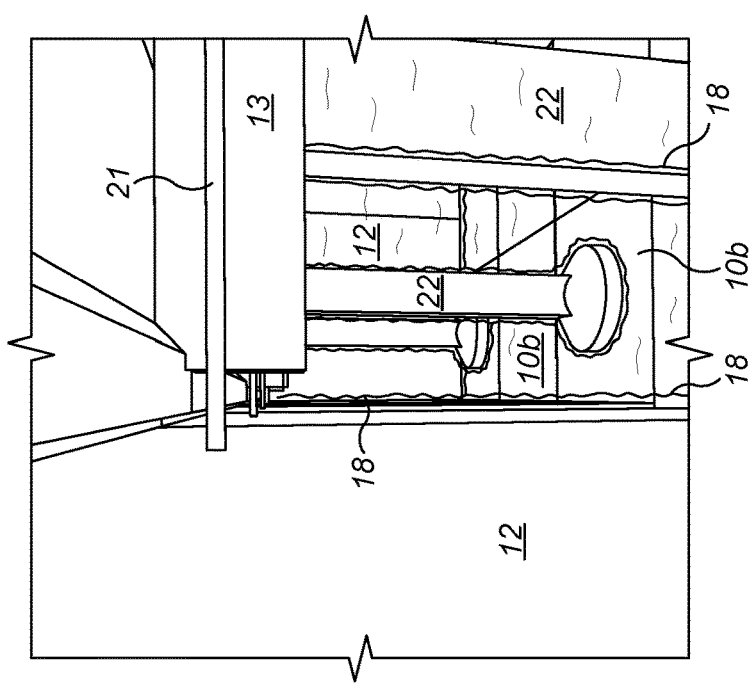
FIG. 15 is a schematic partial perspective cut-away view showing ends of the beams.

A service reservoir incorporating an electronic leak detection and location (ELDL) system is described herein. As shown partially in FIG. 9, the service reservoir has the following features:

- a precast interlocking structure using a double stretcher bond configuration, with precast floor 10 made of sub units 10a (i.e. no in situ cast floor), wall units, or sections, 12 and a roof structure 14 made including lintels 13 and roof units 14a;
- ingress leak monitoring of the precast interlocking structure;

egress leak monitoring of the precast interlocking structure;

corrosion monitoring and/or cathodic protection of metallic components within the precast concrete units;

an outer waterproofing liner 16 outside and beneath the precast concrete structure and a protective geotextile inner waterproofing liner 18 (see FIG. 15, not shown in other Figures for clarity, but takes the form of a flexible liner laid out in the tank to retain water, further details below) inside the interlocking structure.

The sub units 10a of the floor are laid in a double layer stretcher bond configuration.

The method of constructing the service reservoir will now be described with reference to the Figures.

Figure 1:
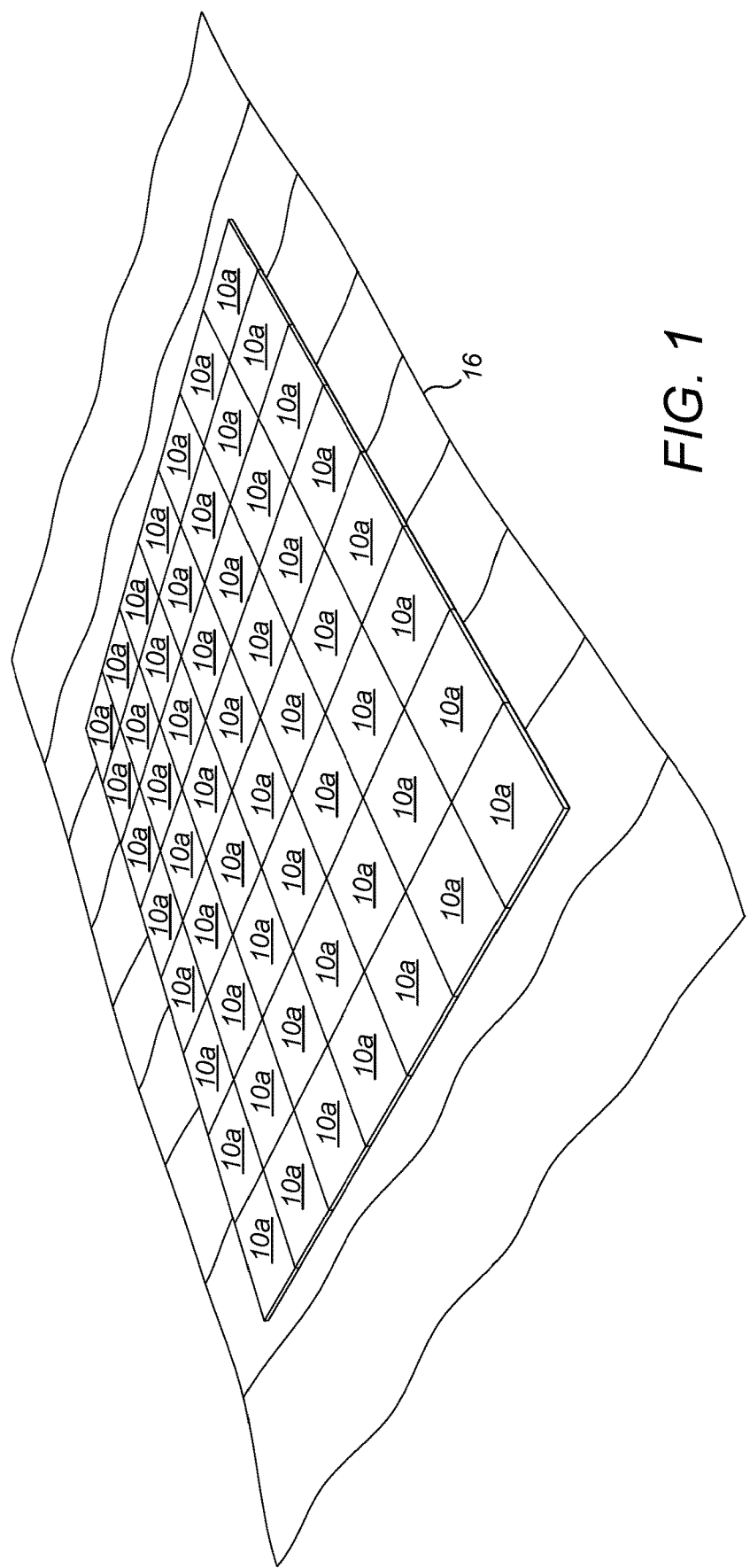
FIG. 1 is a schematic perspective view of a water impermeable outer geomembrane with a service reservoir floor slab structure laid thereon.

FIG. 1 shows the outer liner 16 placed on a prepared site. A first layer of floor sub-units 10a is then laid in a grid pattern on the outer liner 16.

Figure 2:
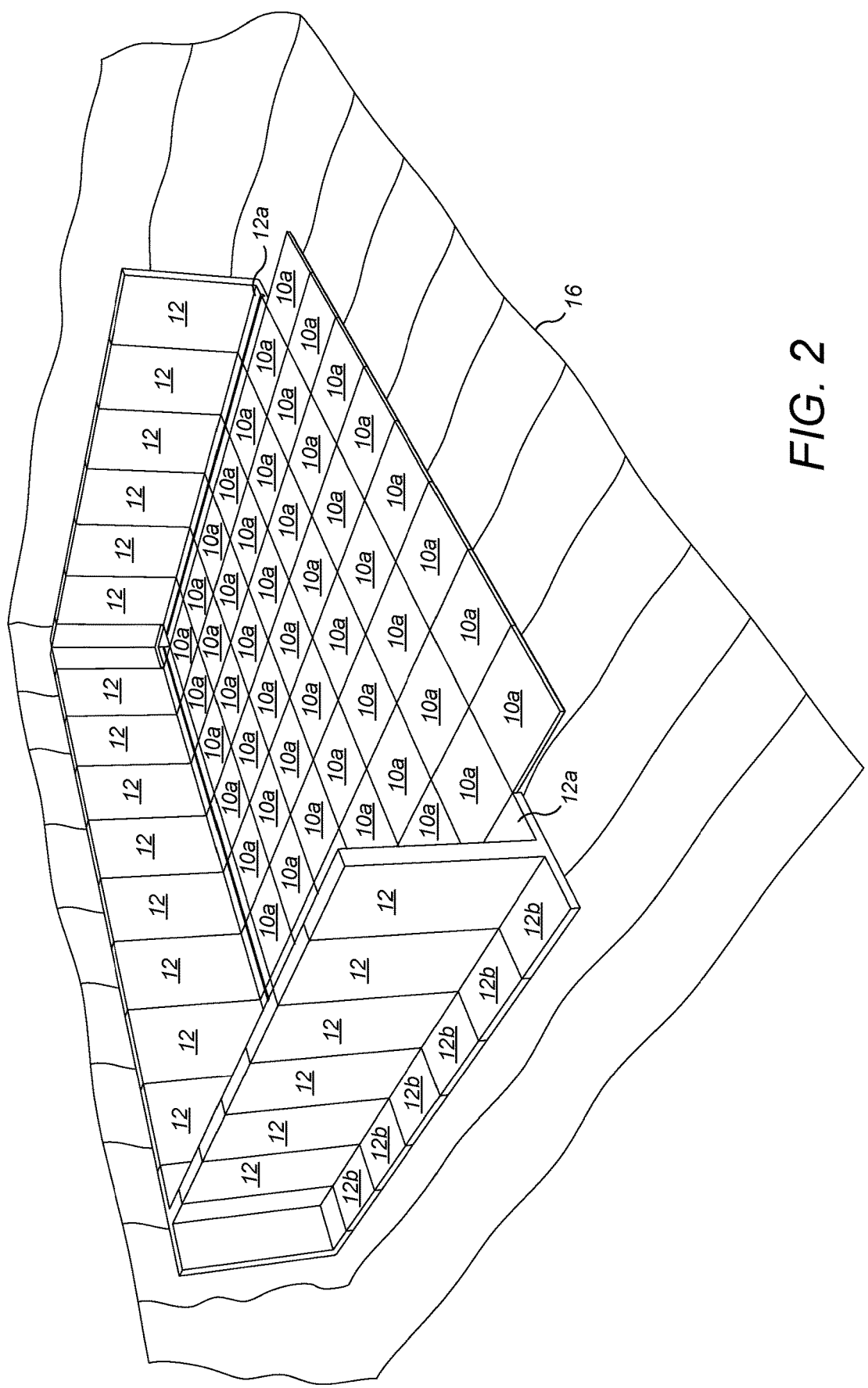
FIG. 2 is a schematic perspective view of geomembrane and floor slab with some wall units of the service reservoir in position.

FIG. 2 shows a plurality of wall units 12 placed around the first layer of floor sub-units 10a. The wall units 12 are shown only partially surrounding the first layer of floor sub-units 10a for clarity, but the wall units 12 will form a complete tank shape. The wall units in this example include an inner foot 12a that extends horizontally to support the wall unit 12 in an upright orientation. The wall units also have outer feet 12b, although these are not essential and may be omitted.

Figure 3:
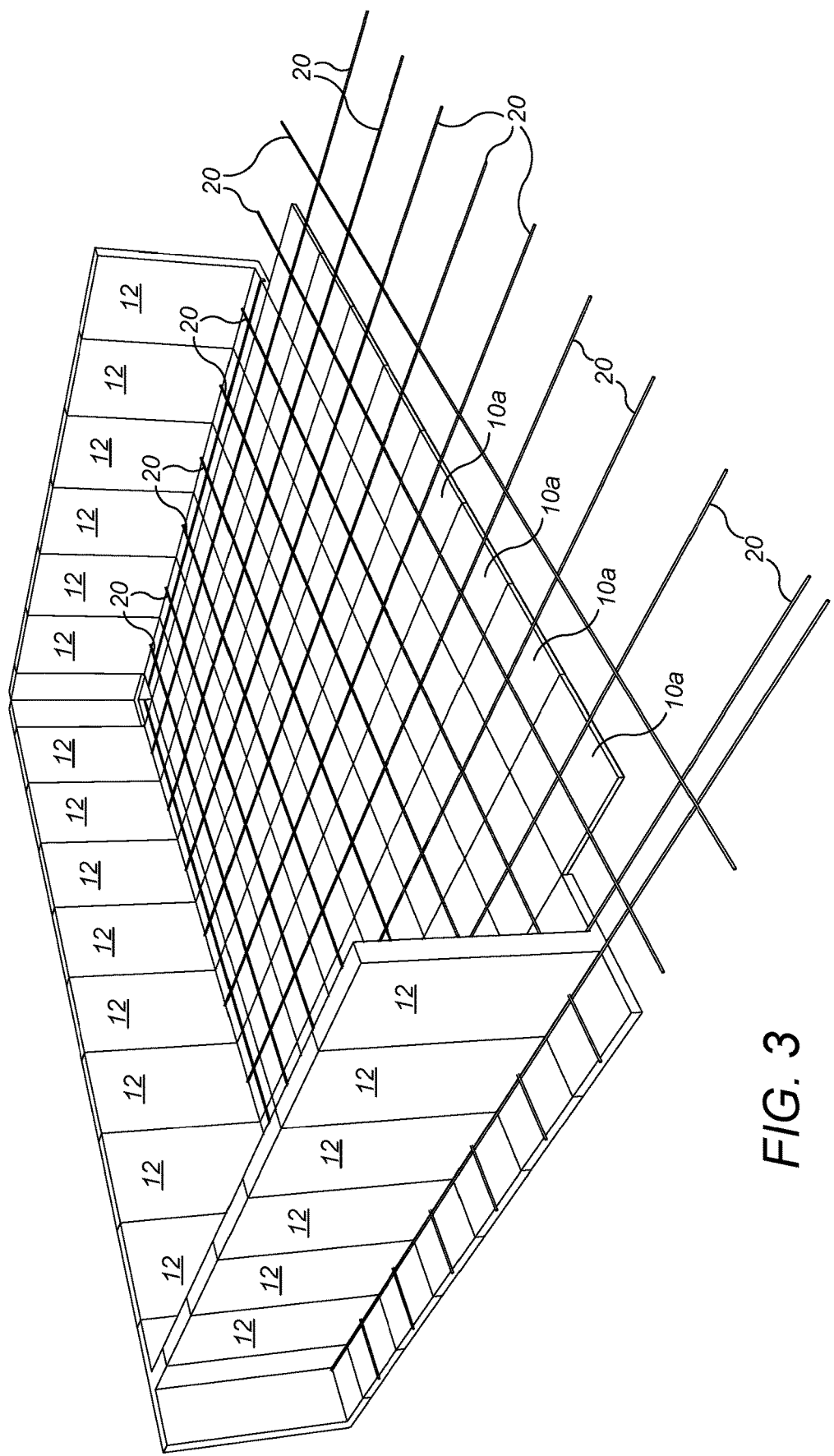
FIG. 3 is a schematic perspective view of the structure of FIG. 2 with metal tie bars in position, with the geomembrane omitted for clarity.

FIG. 3 shows tie bars 20 laid across the top of the first layer of floor sub-units 10a for optional reinforcement.

Figure 4:
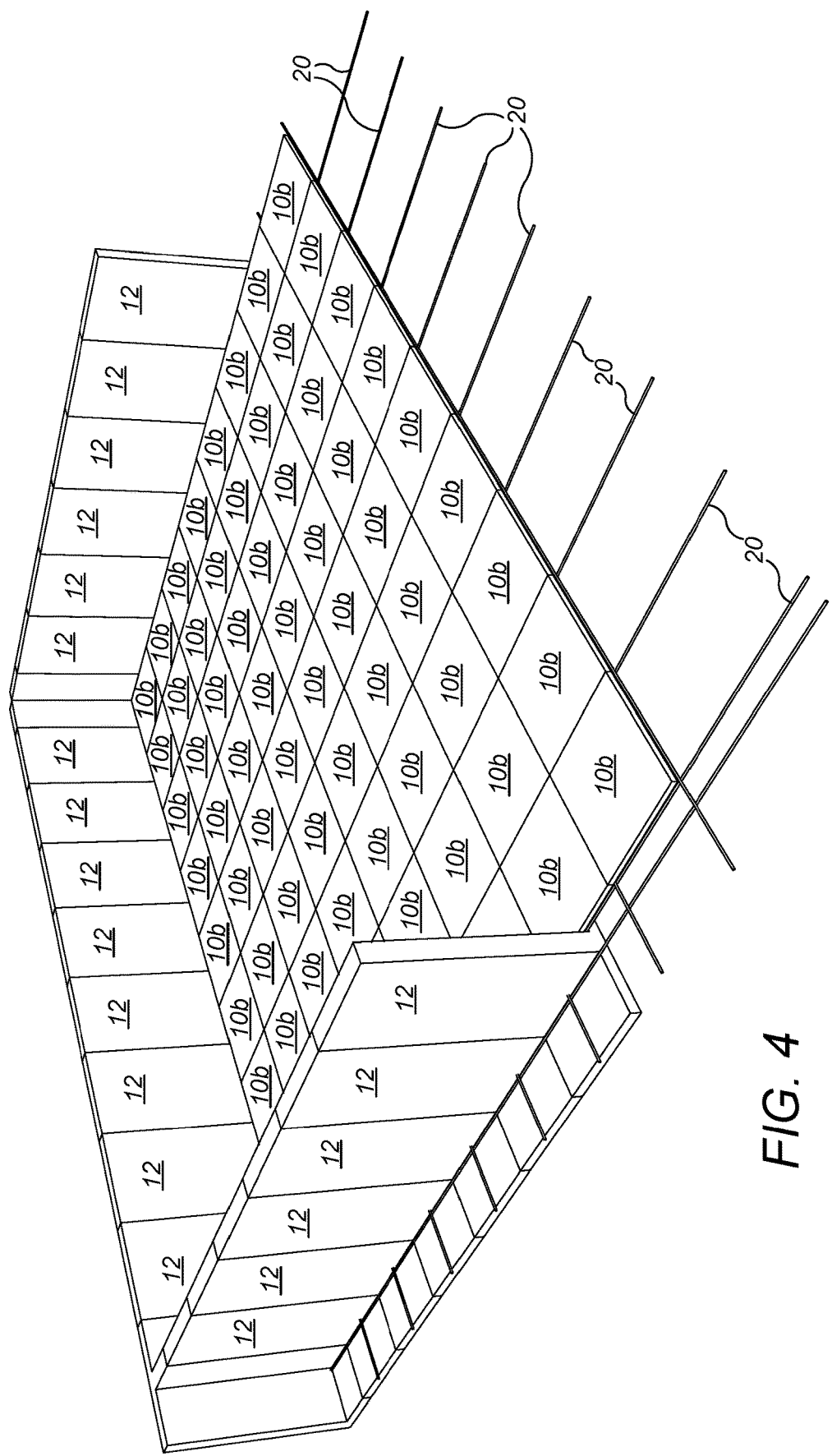
FIG. 4 is a schematic perspective view of the structure of FIG. 3 with a second layer of floor slabs in position.

FIG. 4 shows a second layer of floor sub-units 10b having been placed in position over the first layer of sub-units 10a and inner feet 12a of the wall sections 12, thereby locking the wall units 12 in position.

Figure 5:
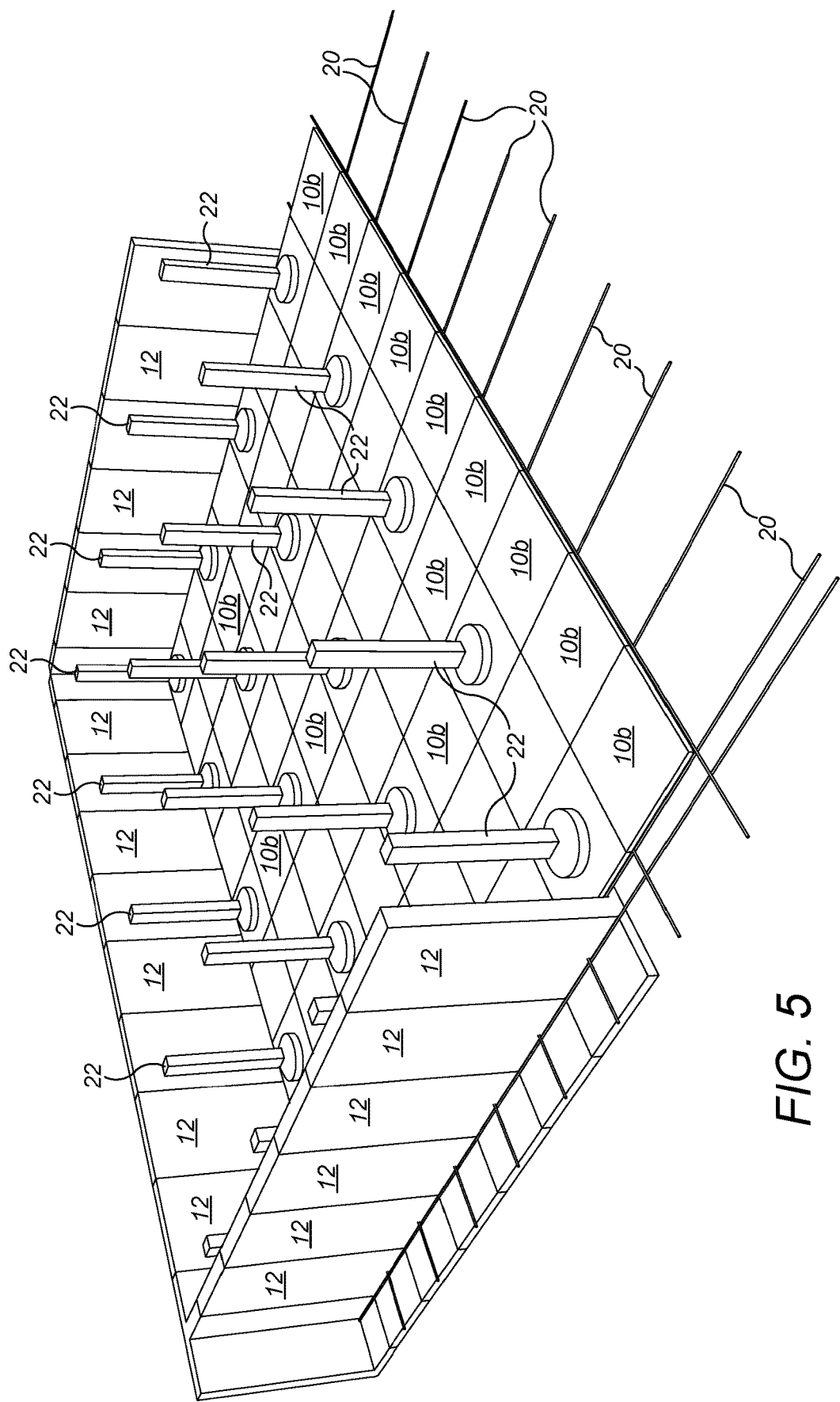
FIG. 5 is a schematic perspective view of the structure of FIG. 4 with support columns of the service reservoir in position.

FIG. 5 shows support columns 22 being place in position on top of the second layer of floor sub-units 10b.

Figure 6:
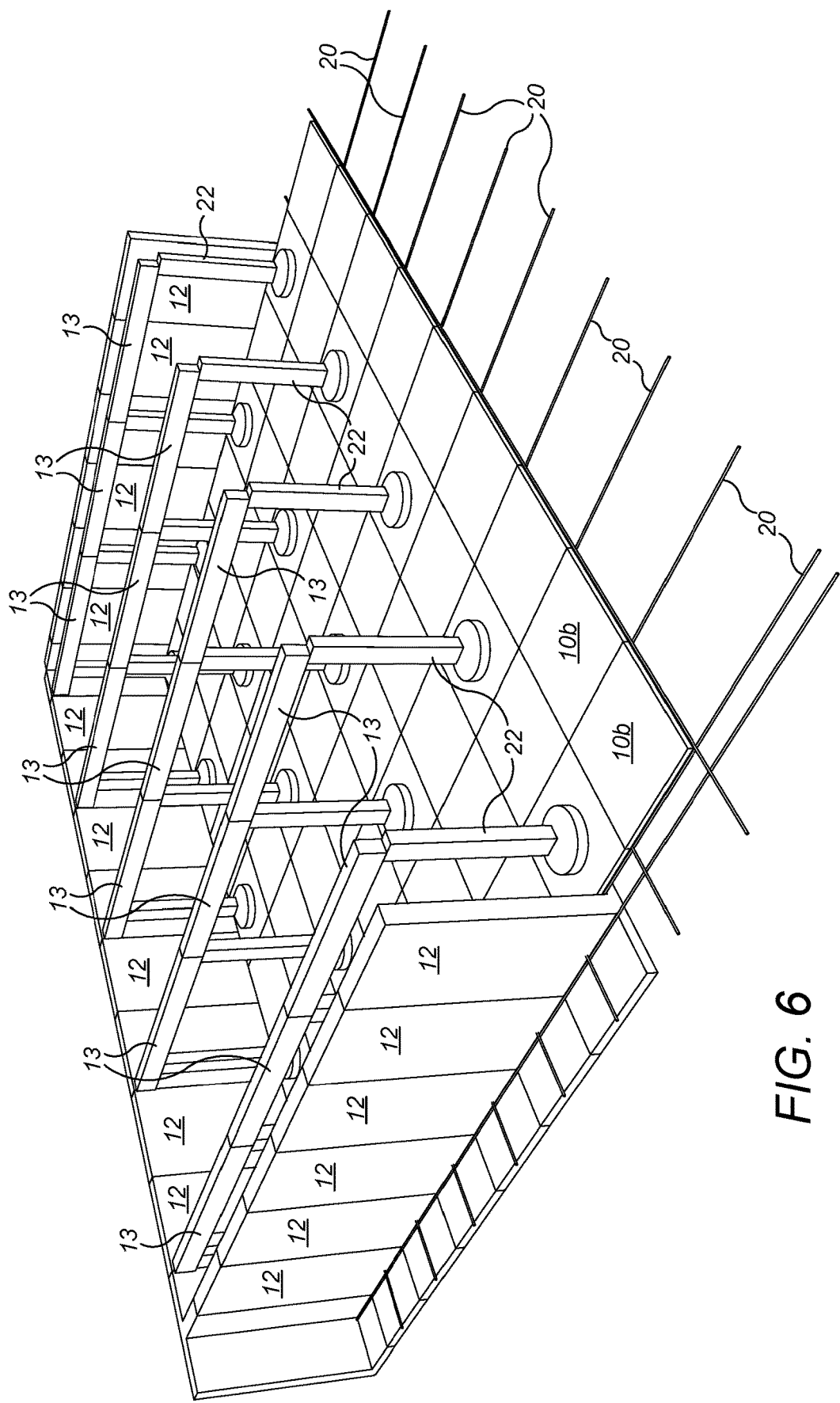
FIG. 6 is a schematic perspective view of the structure of FIG. 5 with beams located on the support columns of the service reservoir.

FIG. 6 shows lintels 13 being placed in position between tops of the columns 12.

Figure 7:
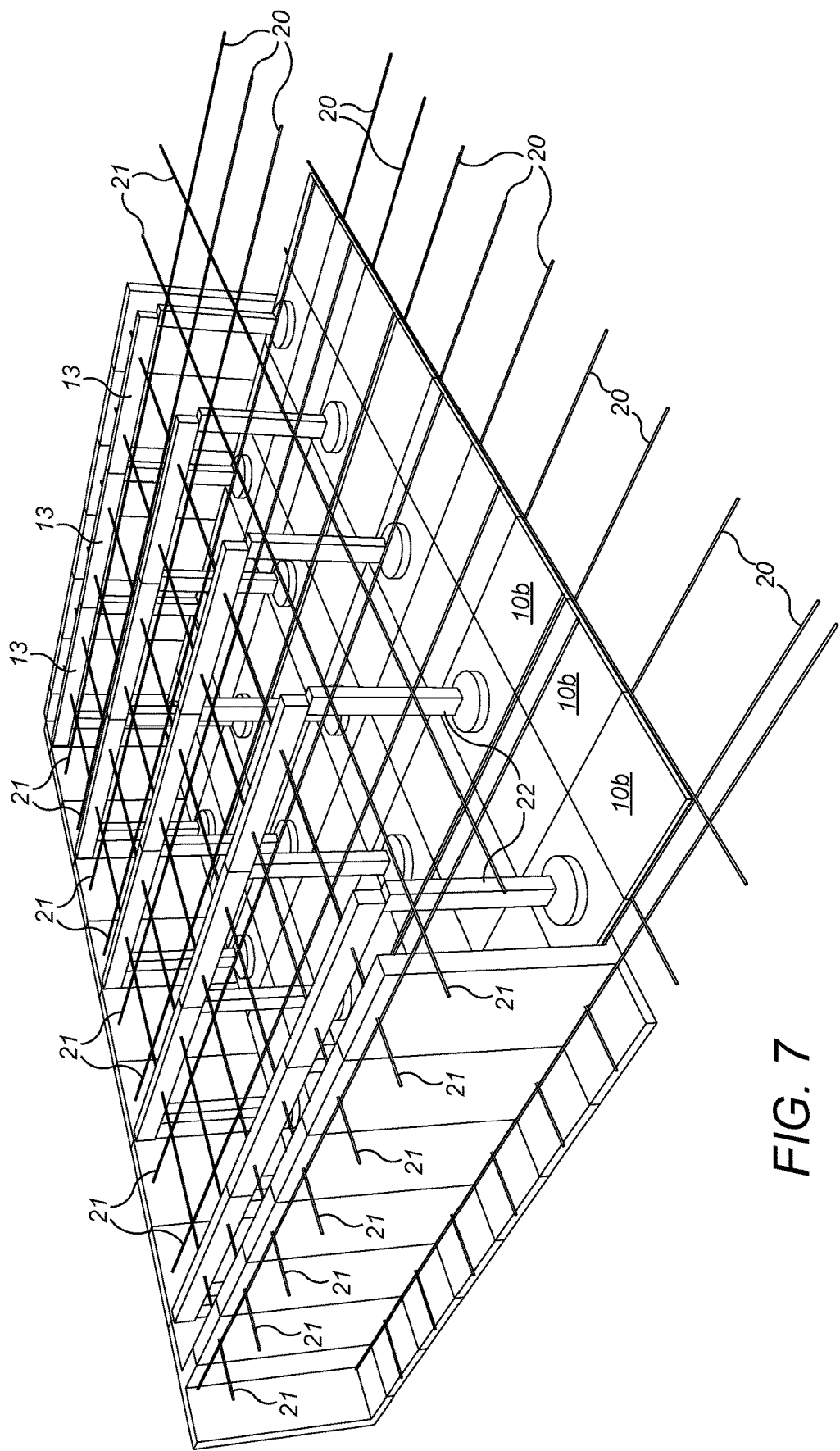
FIG. 7 is a schematic perspective view of the structure of FIG. 6 with metal roof ties of the service reservoir in position.

FIG. 7 shows optional tie bars 21 being place in position over the tops of the lintels 13.

Figure 8:
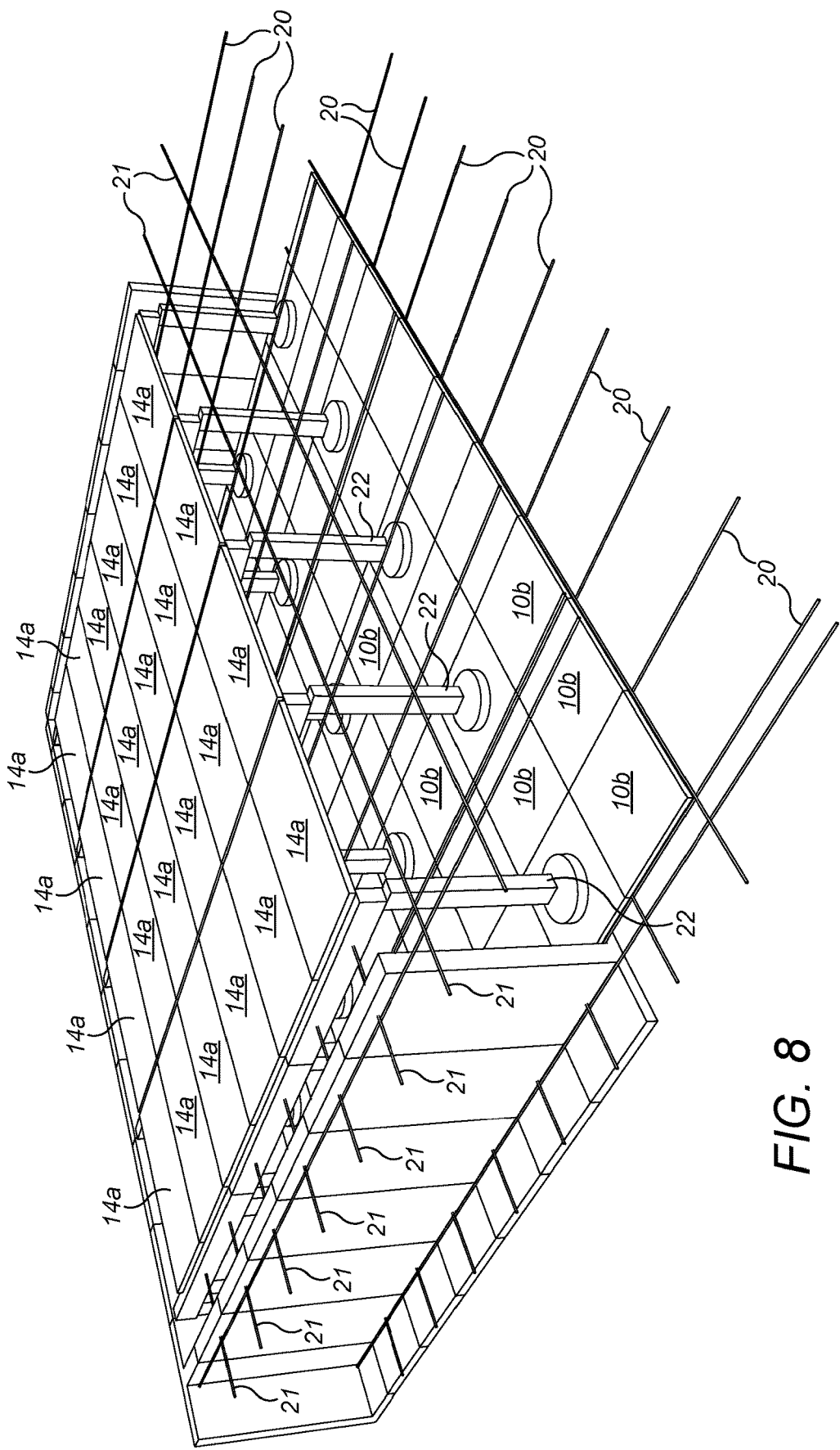
FIG. 8 is a schematic perspective view of the structure of FIG. 7 with some roof slabs of the service reservoir in position.

FIG. 8 shows roof units 14a being placed in position on top of the lintels 13.

Figure 9:
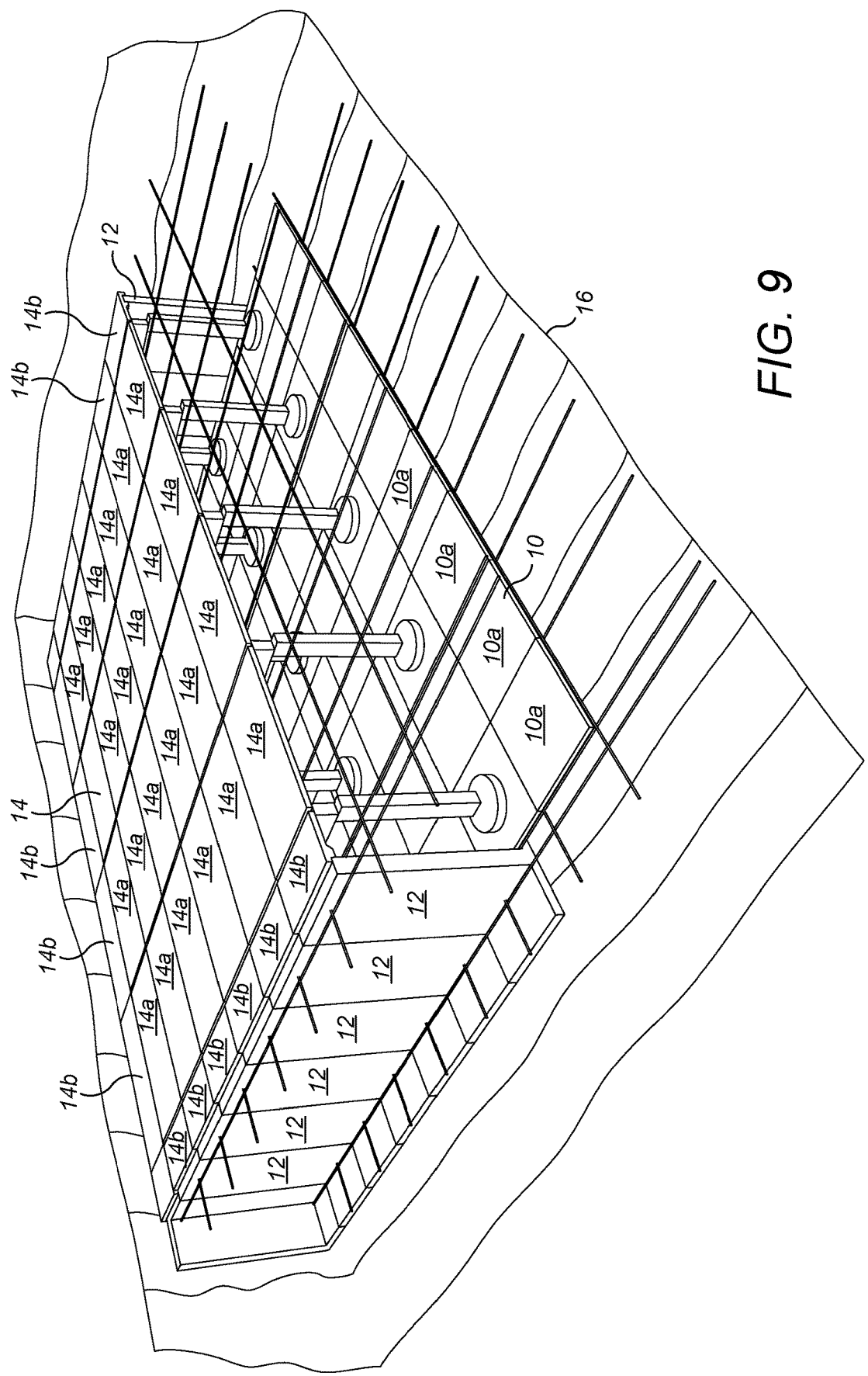
FIG. 9 is a schematic perspective view of the structure of FIG. 8 with additional roof slabs of the service reservoir in position and the outer geomembrane in position.

FIG. 9 shows edge roof units 14b being placed in position.

Various methods of electronic leak detection and location have been disclosed previously. Some of the methods involve the use of a highly resistive plastic geomembrane being installed with electric poles at either side of the membrane. When a fault occurs in the geomembrane an electric connection occurs, which is detected as a current flow.

In one system for electronic leak detection and location a single pole on one side of the geomembrane is used and an operator with another pole being connected to earth outside the geomembrane. The operator carries a pair of sensors and when he passes a hole in the geomembrane a polarity shift is detected, leading to the detection and location of the leak.

In a more sophisticated system, as described in EP0962754, often referred to as a fixed or permanent leak detection system, a network/grid of point sensors is installed beneath the geomembrane to allow for more accurate detection of a leak. For example, sensors may be spaced on a grid of approximately 3 m×3 m, which spacing can lead to a sensitivity of approximately 300 mm. Other grid spacings are possible, for example at intervals of between 3 and 10 metres. In this installation the sensors are located outside the geomembrane, leaks from which are to be detected.

A further improvement of this type of system is to use two layers of geomembrane with the sensors and a conductive geotextile (acting as an electrically conductive signal layer) being located between the two layers of geomembrane (acting as electrical isolation layers) and source electrodes being located outside the two layers of geomembrane in the earth or covering above and below the two geomembranes. The use of two membranes with sensors in between allows an alarm type of detection and location system to be provided, because the sensors are isolated from currents within the material being retained by the geomembrane and also from stray or environmental currents in the earth outside the geomembrane. Thus, when a leak does occur and the moisture leaks into the space between the two geomembranes this allows the electrical signal current to flow with the moisture into the encapsulated conductive textile between the two layers of membrane, the point sensors can detect the increase in current, allowing an alarm condition to be raised if a suitable monitoring system is installed and connected to the point sensors. Such systems exist for both online/permanent monitoring of membrane with suitable monitoring equipment being installed permanently on site and offline systems where only connectors are installed on site requiring power sources and testing equipment to be brought to site in order to test the installed point sensor system manually.

In the embodiment described the ingress and egress leak monitoring is achieved by using the concrete structural members as an electrically isolated conductive signal layer between inner and outer geomembranes made of plastics material.

Electrical Isolation Layer

An electrical isolation layer is used in ELDL systems that are to be completely buried around the periphery. The purpose is to create an environment within an interstitial space between two geomembranes 16, 18 that is electrically isolated from the outside earth and the internal environment inside the reservoir. An upper 18 of the two geomembranes is often known as the 'primary waterproofing liner' and it is the primary waterproofing liner 18 that is normally the 'service facing' waterproofing liner. The waterproofing systems that are deployed for the purpose of electrical isolation are electrically non-conductive as is the primary waterproofing liner 18. In this description, the term liner or waterproofing liner will occasionally be used to refer to the geomembrane and vice versa.

In the case of the service reservoir described herein the electrical isolation layer will need to be completely wrapped in the geomembranes 16, 18. The outer geomembrane 16 will be split into three sections:

i. Below the precast floor 10
ii. External to the wall units 12
iii. Across the roof structure 14

The purpose of the electrical isolation layer is to ensure that in the event of damage to either of the geomembranes 16, 18 that an electrical signal current follows any moisture through a hole in the geomembrane 16/18, rather than (in accordance with Ohm's law) where there is a single lining system the signal may simply pass around the edge of the waterproofing liners 16/18 (or, go through a water pipe, or pass through metallic structures/fixings/ladders/railings bolted through the waterproofing liner) if this is the path of least resistance for electricity to travel.

In prior art ELDL systems, where there is a double lining system having inner and outer geomembranes between, there is provided a conductive medium to augment the passage of an electrical signal from a hole in one of the geomembranes to one or more sensors surrounding it. In such prior art systems there would normally be a conductive signal layer (for example non-woven fabric based).

Primary Waterproofing Liner

The primary waterproofing liner is the 'service facing' part of the geomembrane construction and as the name would suggest this waterproofing liner has the primary responsibility for integrity of the waterproofing system. In reality both the inner (primary) 18 and outer 16 waterproofing liners are equally important in terms of electrical isolation enabling integrity monitoring, and in the context of service reservoir described herein one will protect from water/contaminant ingress the other from water egress.

The primary waterproofing liner 18 in respect of the service reservoir would be the face of the waterproofing liner to:
i. Internal tank floor
ii. Internal tank walls
iii. External upper roof waterproofing liner Service Reservoir Configuration In the context of service reservoirs it has been realised that it is possible to eliminate the need for any conductive signal layer within the interstitial space between waterproofing liners 16, 18, by placing the precast concrete units within this interstitial space. This has two advantages:
i. The Electrical Isolation Layer forms the ingress prevention against positive water pressure from outside that tank;
ii. The precast units become the conductive signal layer for the purposes of the ELDL system.

The conductivity of the precast concrete for the floor 10, wall units 12 and roof 14 is controlled to ensure the proposed mix of concrete and steel reinforcement sits within the necessary band of compatibility required by the ELDL system. Also plasticisers are known to significantly decrease the electrical conductivity of concrete and so their use is monitored accordingly.

Therefore, a suitable method would be to test the conductivity of the precast concrete itself to ensure the proposed mix of concrete sits within the necessary band of compatibility required by the ELDL system.

In the event that the concrete cannot be manufactured effectively with sufficient electro-conductive properties to suit an ELDL system, then some material can be incorporated into the casting process, perhaps fixed to the face of the shuttering on either side of the precast unit or added to the concrete mix such as carbon, graphene or steel filings.

The roof can either be constructed using a traditional double lined ELDL system complete with conductive signal layer between within the interstitial space both running over the top face of the roof or the soffit of the roof could be lined with a single liner utilising the structural elements of the roof as a conductive signal layer with a single liner over the top face of the roof.

Alternatively, the roof may not be constructed of concrete and instead could be a floating cover roof incorporating a double-lined ELDL system utilising a tile system approach as described in WO2016/001639, the contents of which are incorporated herein by reference. In drinking water service reservoirs floating covers protect the water from contamination, evaporation, and the loss of water treatment chemicals (such as chlorine). In waste water tanks floating covers prevent odours, collect biogas, and prevent the build-up of algae.

FIGS. 17a-c show an embodiment of a structure of the wall units 12 that provides weight saving (and cost saving). In themselves (even without the weight saving design) the wall units 12 design is unusual, because a gap between the adjacent wall units 12 is not filled. This is because in the service reservoir described herein, the concrete of the floor 10, wall units 12 and roof 14 are not directly providing a waterproofing function as is the manner of conventional concrete tank construction. In the service reservoir described herein the concrete is only required for structural strength/rigidity and to detect leaks through the waterproofing liners 16,18 either side.

Given that the concrete of the floor 10, wall units 12 and roof 14 is not used in any way to waterproof the tank the concrete is free of design constraints that require very high grade concrete with crack width control measures to minimise cracking by introducing very complicated structural design and large quantities of steel reinforcing bars. It is also not necessary for the wall units 12 to be interconnected on site by pouring in-situ concrete and connecting reinforcing cages together with the protruding bars from the edges of each precast units; this mean that gaps can be left between the wall units 12 and those gaps (20-50 mm wide) between the individual wall panels can be used as drainage in case of a leak, whereby any water that might collecting between the liners 16,18 during a leak alert can freely drain out via weep tubes to a waste drain. In addition, as shown in FIGS. 17a-c and described below, it is possible to use formers that are pulled out after casting of the wall units 12 to leave cavities 12e in the edges of the concrete wall units 12, which saves weight, concrete cost, shipping cost and reduces the size of crane required to lift the wall units 12 into position.

The precast concrete wall panels can be produced with 'pull-out formers' (not shown), either tapered or split for ease of extraction. The 'pull-out formers' are initially fixed to each side of the shuttering (concrete formwork) during production of the wall units 12; this has the effect of excluding concrete from spreading and forms a 'shear panel' 12d within the main body of the wall 12 see FIG. 17c). The purpose of the modification to the wall units 12 is to save on weight, whilst maintaining full structural adequacy.

The wall units 12 incorporate a foot section 12a, shown in FIGS. 17a and 17b. This allows the preformed wall units 12 to stand unsupported when delivered to a site. Also, the foot section 12a is laid to abut an edge of adjacent first layer sub-units 10a of the lower layer of the floor. The second, upper layer of sub-units 10b is then laid over the abutting foot section 12a and lower layer sub-units 10a to lock the wall units 12 into position. The weight of the second layer of sub-units 10b in the double layer stretcher bond floor 10 therefore prevents the wall units 12 tipping backwards when the service reservoir is filled.

The structure of this embodiment of wall unit is only possible because of the way the service reservoir is constructed. The 'pull-out formers' are the novel part of the design because normally a designer would not be able to create a water retaining structure with the cross-section shown in FIG. 17c. There would be no back to the jointing system necessitated by traditional/conventional design, whether this jointing was hydrophilic sealant or a water-bar for example, but in the embodiment described above uses an 'open' joint, so it does not matter. Therefore, the advantageous transfer of waterproofing functions to the liners 16 and 18 allows for innovative design of the wall units 12 for this service reservoir.

ELDL Components

With the possible exception of the roofing system (assuming the sufficient electro-conductive properties of the precast concrete units can be achieved, see above) in order to provide a composite construction incorporating ELDL functionality, the sensors, anodes and reference electrodes are deployed within the precast concrete units 10a, 12 themselves. The best method for this is to cast in a tubular hollow perhaps using a prepared timber dowel that when removed will allow the insertion of a flowable grout and sensors/anodes/reference electrodes on site.

Figure 11:
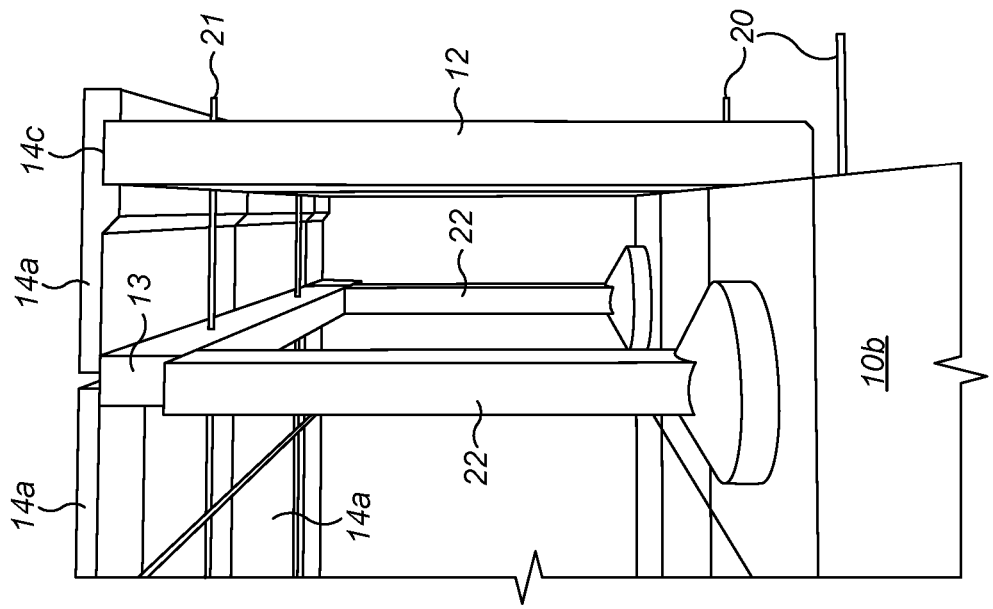
FIG. 11 is a schematic partial perspective view showing roof/wall joints of the service reservoir.
Figure 10:
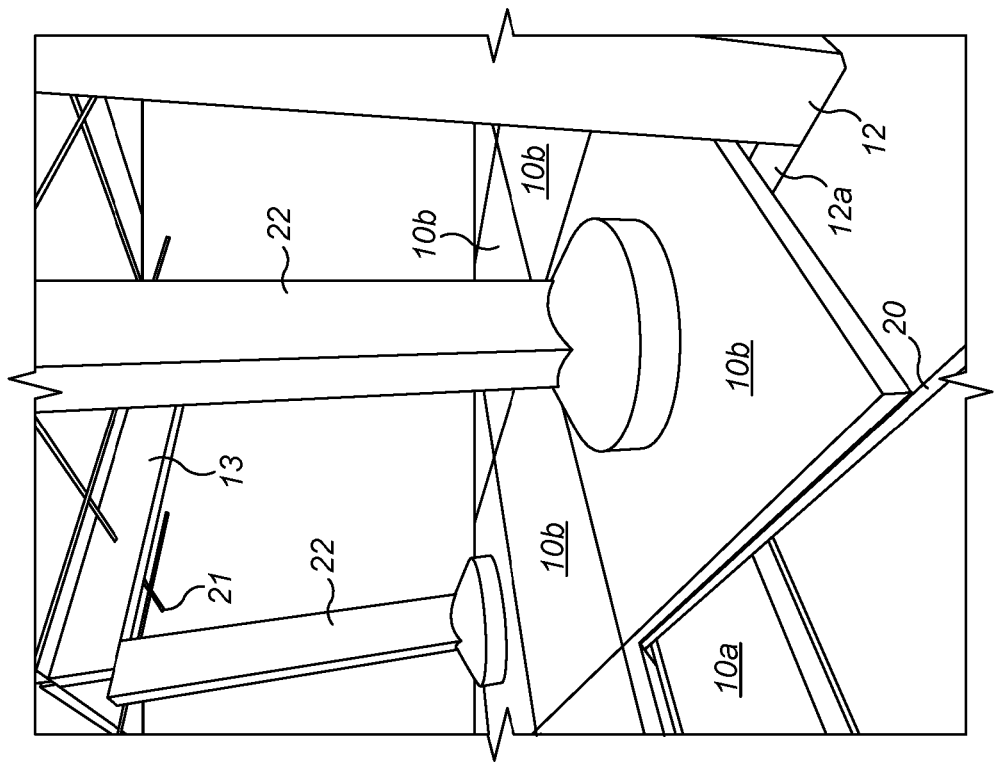
FIG. 10 is a schematic partial perspective view of the floor slab showing positions of the columns.
Figure 13:
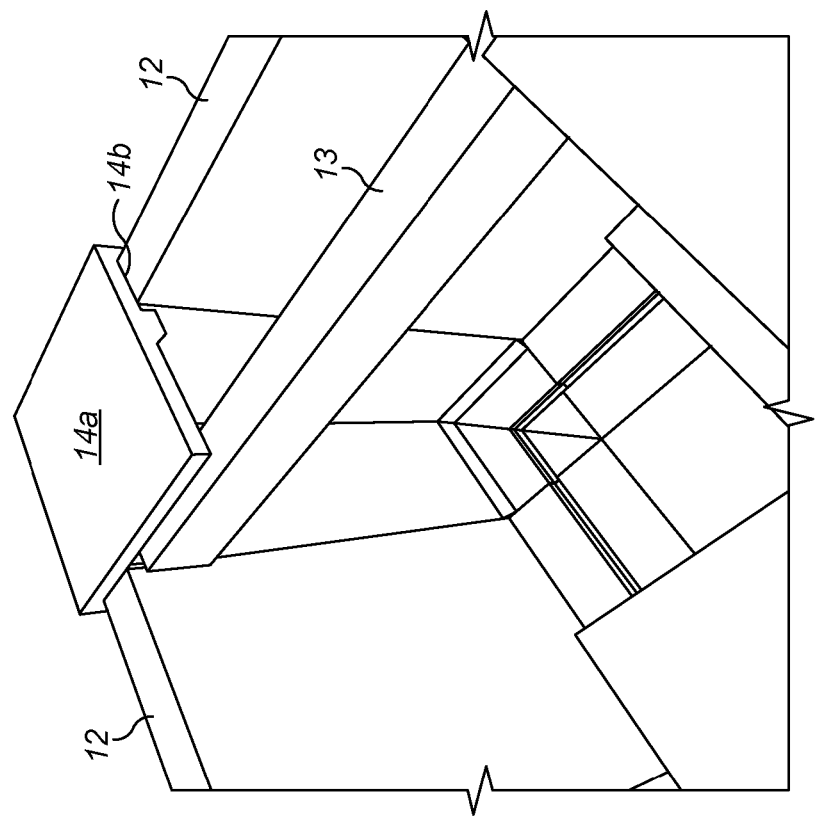
FIG. 13 is schematic partial perspective cut-away view showing a corner of the service reservoir.
Figure 12:
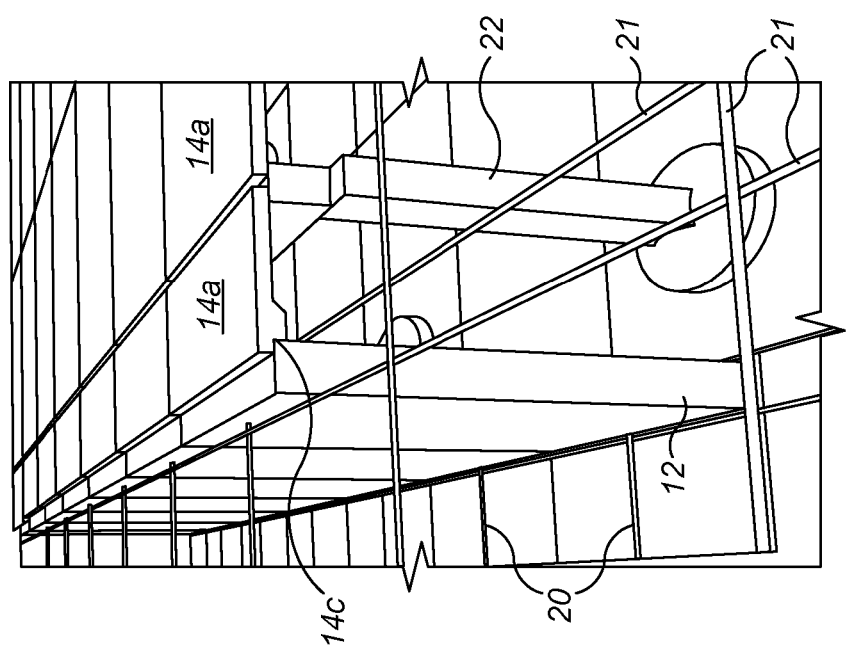
FIG. 12 is a schematic partial perspective cut-away view showing the wall/roof structure.

The sensors/anodes/reference electrodes of course have a tail of cable attached that needs to exit from the precast units in a common geometrical positions that allows them to be run to a valve house (not shown) of the service reservoir. The best position for the cables to exit is via a booted connection through the roof waterproofing liner inside a HDPE duct that can be bonded to the waterproofing liner itself. The top edge of the precast concrete roof units 14*a* has a rebate 14*c* on the inside face below the roof slab but above the waterproofing liner termination where the cables run around the perimeter of the tank (see FIG. 11). It is in the top face of this rebate that there are 'cast in tubes' running vertically parallel to the internal face of the precast concrete.

Other alternatives for placement of sensors in the floor 10 &/or the wall 12 would be to leave slots/rebates in the face where sensors can be placed on site then filled with mortar before the waterproofing liner is installed.

For the ELDL of water leaks out of the service reservoir there would need to be a connection to the water inside the tank. One option is to connect onto the metallic valves which themselves have a direct connection to the water inside the HDPE inlet and outlet pipes.

For the detection of a leak into the tank/through the electrical isolation layer then source electrodes must to be placed beneath the lower waterproofing liner and outside the waterproofing liner in contact with the covering material/soil.

The roof 14 could be constructed in a more orthodox fashion with sources above and below the upper and lower waterproofing liners respectively, with the sensors and conductive textile encapsulated between the two. Or alternatively monitoring of the primary liner only could be offered in the event that liner is deployed to the soffit of the roof with source electrodes being placed in the soil/sand/gravel or other covering above the roof.

Electrical Continuity of Reinforcing Bar

Given that the precast 10*a*, 12, 14*a* units effectively have a dual purpose in the service reservoir described, it is advisable that steel reinforcing bars 20 are installed carefully (perhaps pre-welded/tied together into cages) such that within each individual unit 10*a*, 12, 14*a* there is electrical continuity of all the steel 20 and additionally a cable, or other connector, should be provided from the cage in each unit 10*a*, 12, 14*a* that can then be connected to the adjacent units 10*a*, 12, 14*a*. In addition, advantageously the electrical continuity of the steel reinforcing bars inside each unit and to each other, also allows the functionality of corrosion monitoring via installed reference electrodes connected to the necessary control equipment and even cathodic protection of the steel within the precast units via installed anodes connected to the necessary control equipment.

For the purposes of electrical continuity between the precast units and all the steel reinforcement contained therein. The same result can be achieved using protruding stainless steel threaded bar to enable electrical bonding straps to connect the units 10*a*, 12, 14*a* together.

An additional option for the construction of the wall units 12 and floor sub-units 10*a* is to electrically isolate adjacent wall units 12 and/or floor sub-units 10*a* from each other and allow each entire wall unit 12/floor sub-unit 10*a* to act as a tile-type sensor, as described in WO2016/001639, the contents of which are incorporated herein by reference.

The leak detection may be implemented by using the reinforcing steel of the wall units 12 and floor sub-units 10*a* as tile sensors. In this way, the separate wall units 12 and floor sub-units 10*a* are individually electrically connected to a control unit of the ELDL system, where the control unit analyses signals received from the wall units 12 and floor sub-units 10*a* to detect leaks from the service reservoir, in particular from the inner lining 18. The reinforcing bars 20 are not used in this configuration.

In this way, breach of either of the inner or outer liners 18,16 will result in triggering of a sensor adjacent to the breach, which identifies a specified location, defined by the area of the wall unit 12, in the service reservoir that has been breached. The area corresponds to the area of the wall unit 12 that has been triggered. Thus, a plurality of defined zones is separately monitored, with each zone being defined by one of the wall units 12 or floor sub-units 10*a*. The wall units 12 are isolated from each other by the gaps between them, whereas uniquely the floor sub-units 10*a* can be isolated from each other by using concrete with a higher electrical resistivity achieved by using plasticiser additives, plastic fibres, or resin in the joints between discrete floor sub-units 10*a*, or by painting the three non-sensing surfaces of the concrete in an electrically non-conductive paint or coating.

Waterproofing

Internal Waterproofing of the Service Reservoir

Waterproofing the service reservoir is of course the main concern and there are various systems available that could achieve the required goal:

i. Studded cast-in types of liner cast into the concrete surface during production of the precast units
ii. Spray applied polyurea coatings
iii. Loose laid There are a number of considerations to take into account in the material selection process:

i. Movement tolerance
ii. Electrical conductivity
iii. Regulation 31 approval (primary) for contact with potable water in the UK or other potable water contact approvals that may be required for such an applications in other geographical locations around the world
iv. Internal finish & slip resistance for personnel entering tank intermittently (primary)
v. Internal durability/resistance to chlorinated water & water jet cleaning (primary)
vi. External durability (electrical isolation layer)

The abovementioned criteria swiftly reduce the attractive options for water proofing on a practical level whilst all would provide the necessary waterproofing and electrical isolation properties required by the concept. There is a danger that anything bonded to the precast units will potentially fail in the event of quite small lateral or vertical movement.

Movement, or the possibility of it, makes both studded cast-in types liner and spray applied systems less attractive, because they are likely to fail. In the interests of completeness however we would also point the other problems with studded cast-in types of liners in relation to the abovementioned criteria which are: lack of Regulation 31 approval; can look scruffy after the casting process; very expensive to purchase; requires a lot of onsite extrusion welding to complete the surfaces between units which can further add to the poor visual appeal of the completed waterproofing system as well the higher cost of extrusion welding over that of fusion/wedge welding.

Polyurea spray applied system suffer none of the issues relating to Reg 31 approval or visual appeal, there is no extrusion welding necessary, but it is likely to crack in the event of movement and it remains a highly expensive option given the thicknesses that will need to be applied to achieve an electrically non-conductive finish which would need to be carefully verified using an ASTM D7953 arc test.

Loose laid waterproofing liner is therefore the most favoured approach and one that could achieve the desired result effectively so long as due consideration is given to the complexity of producing a loose laid waterproofing liner system that provides neat and tidy finish and also the sensitivity to damage by site carelessness of following trades, with particular reference to the waterproofing liner beneath the structure that will be inaccessible once the structure is in place above it.

The most appropriate waterproofing liners for a loose laid waterproofing liner approach are:
i. Polypropylene
ii. Butyl rubber
iii. Polyethylene
iv. PVC The selection criteria that must be considered here are as follows:
i. Regulation 31 approval (primary) or other geographically required regulatory approval for contact with potable water
ii. Cross compatibility for welding with external/roof waterproofing liner
iii. Electrical conductivity
iv. Weld compatibility with regulation 31 approved pipes or other geographically required regulatory approved pipework for contact with potable water
v. Durability The first criteria of Regulation 31 approval immediately disadvantages the use of butyl rubber and PVC, in addition these products would struggle with cross compatibility, pipe connections (butyl) and electrical conductivity (butyl) and durability (PVC).

This leaves polyethylene and polypropylene, both materials types are present in materials approved within the Regulation 31 approved list. Polypropylene is an excellent material but one which is really designed around ease of installation making it soft and easily workable, it can also be welded without extrusion reinforcement but this relies on great skill because if polypropylene is overheated in the welding process it release oils that make the weld seem good but allows it to simply fail sometime after the initial installation. Polypropylene's Achilles heel is the very flexibility which is it most beneficial property, this makes it extremely easy to damage both during and after the installation and with particular reference to high pressure cleaning. Another consideration with polypropylene is that it is not cross compatible with any form of pipework currently on the market.

This leaves us with polyethylene and in turn the Regulation 31 Approval means that we have only HDPE to work with. HDPE is a stiff and very durable material that will last an extremely long time, the problems with it relate to its installation due to its stiffness but those who are used to working with it have no reservation about lining a tank with it.

The question of neatness is still an issue. In order to create a neat installation it will be necessary to try to design and install the tank in a manner that suits the lining of it, rather than the normal position which is that a leaking tank not designed to be lined is fitted with a liner 'bag'. One consideration under the Construction Design and Management Regulations in the UK with regard to the operation and maintenance of the tank is the slipperiness of wet HDPE waterproofing liner where the designers would need to consider the risk to the end users or maintenance crews. Slipperiness of the floor liner could be a major issue during the cleaning and inspection of tanks in service which we would overcome by the use of a structured/textured finish for the floor waterproofing liner.

Optimum Tank Geometry for Internal Lining

The optimum geometry for the tank on plan would be lozenge shaped or a square/rectangular shape with curved internal corners.

The inner waterproofing liner 18 covers an upper layer of floor units 10b, the interior of the wall units 12 and the exterior of internal columns 22.

It is also desirable to minimise or eliminate any angular detailing such as column thrust blocks, ideally the columns 22 will be circular and dropped into 'sockets' in the floor 10 in order to keep the floor waterproofing liner as flat as possible with only the scour/sump and the wall 12 to floor 10 joint necessitating changes in the direction of the waterproofing liner.

Figure 14:
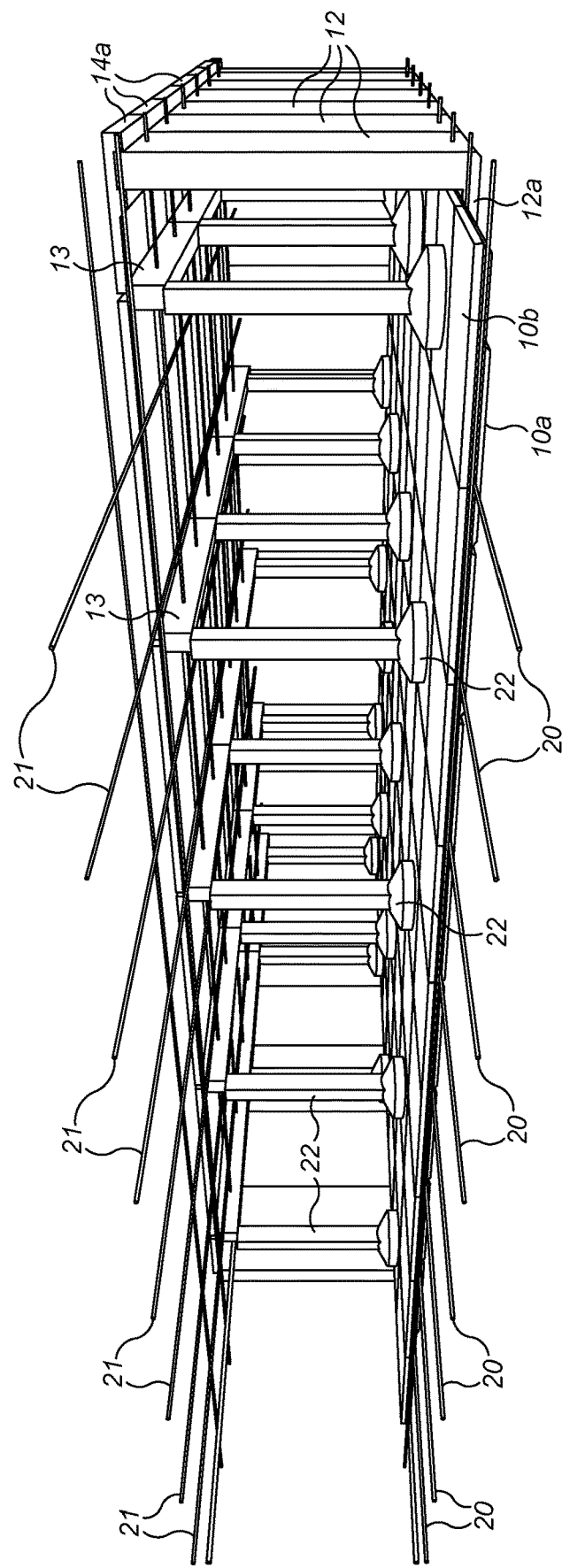
FIG. 14 is a schematic partial eye level perspective view of the service reservoir.
Figure 16:
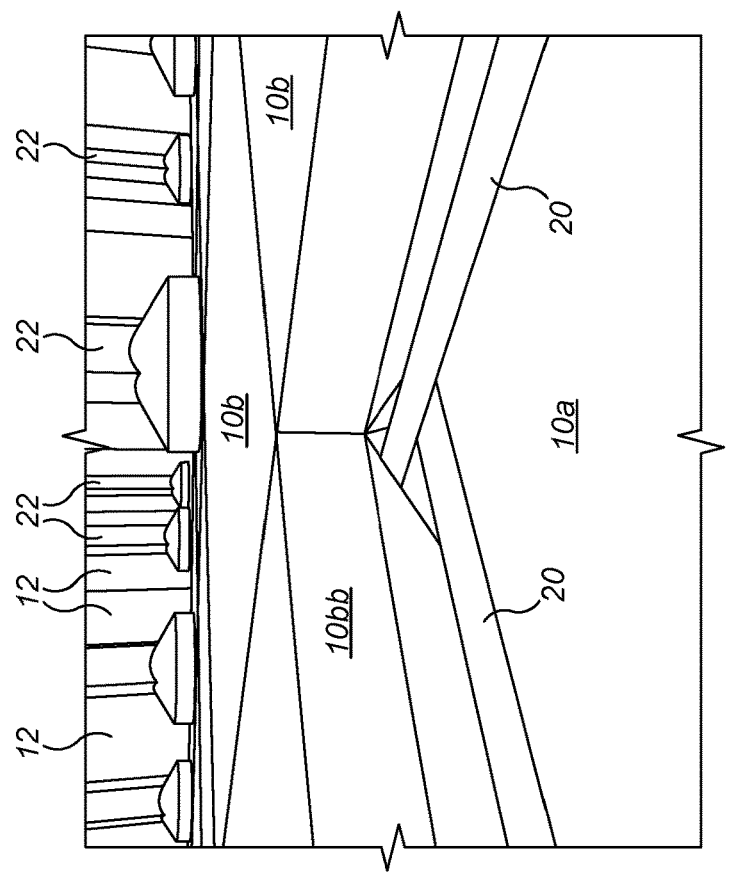
FIG. 16 is schematic partial perspective cut-away view showing details of the floor slabs and tie bars.

The roof 14 includes lintels 13 that are laid across the tops of the columns 22, as shown in FIG. 6. Steel reinforcing bars 21 are then located (see FIG. 7) in a grid pattern through openings in the lintels 13 and at upper parts of the wall units 12 (or possibly in lintels 13 laid on top of the wall units 12). After that the roof units 14a are placed on the lintels (see FIGS. 8 and 9). Detailed views are shown in FIGS. 10 to 13, showing the rebate 14c in the roof units 14a. FIG. 14 shows a view without the inner liner 18 from eye level to show the internal detail. FIG. 16 shows the inner liner 18 only schematically, particularly showing the joins, given the transparent nature of the liner 18. FIG. 16 shows chamfered lower edges of the upper floor units 10b to show how the reinforcing bars 20 are received.

Columns

One option for the lining of the columns 22 is to use HDPE pipes as permanent external sleeves for precast concrete columns 22, although if we use these pipes as 'formwork' in fact the HDPE pipe will need to be retained by a rigid metal shutter whilst the concrete cures inside to ensure that the HDPE pipe does not deform with the warmth of the concrete's chemical curing process.

It is envisaged that if this technique could be developed (using Regulation 31 Approved pipe) then it would vastly simplify both the lining and the connection between floor waterproofing liner 16 and column 22, where the waterproofing liner 16 could be welded directly to the foot of the column sleeve.

Another alternative could be to use precast concrete columns 22 to suit the internal diameter of available HDPE pipe and drop the pipes over the concrete columns 22 to form a cover, although this option does then require a further operation on site. Although in the alternative this might improve the ability to place sensors within the columns 22 or get floor sensor cables out of the tank waterproofing liner 18 more easily through cast in channels in the face of the columns 22.

Again electrical continuity of the columns 22 with the reinforcing bars 20 in the remaining units 10a, 12, 14a would need to be considered and connections made to the floor and roof to make the entire structure electrically continuous.

Along the centreline of a row of columns 22 we could envisage using an HDPE casting in termination profile being deployed, cast into the floor units. This would allow the neat termination of the floor waterproofing liner with an extrusion weld running along the aforementioned column centreline. This would avoid the necessity to have holes in the waterproofing liner before and after each column in order to remove a fusion welding machine after forming the wedge weld between liners at junctions between horizontal and vertical structural elements, which would then have to be patched with unsightly round sections of geomembrane with extrusion weld around.

It is important that during the casting process the cast in HDPE profile is installed carefully, straight and allowing enough overhang within a shutter (perhaps bulked with polystyrene either side to allow slight protrusion of the plastic profile, thereby allowing the casting profile itself to be butt welded to the adjacent profile in the next/adjacent precast unit.

Wall Floor Junction

Adapting further sections of Regulation 31 Approved HDPE pipework for use in the service reservoir by cutting some pipes lengthways into quarter segments and using this as a 'skirting' detail around the perimeters as an alternative to a filleted concrete wall/floor detail. The idea would be to form skirting from the quarter segments and then weld them together in the same way as fusion butt welding full pipes (except by hand). This would provide an excellent termination detail for both the wall waterproofing liner and the floor waterproofing liner, where geomembrane can be extrusion welded to the 'cove skirting'.

The reverse approach could be used around the edge of the scour, which is a drain in the floor where the outer curve of the pipe could be used, to change lining direction and similarly at the foot of the scour the same detail as the floor wall joint could be created where the inner curve of the pipe could be used as a 'cove skirting' to change direction of the liner as described above.

Even where the corners of the tank are rounded internally it will be possible to create this 'cove skirting' detail by cutting out lateral segments of the quarter section and welding them back together to form the curved skirting detail, or simply using geometry cut out of standard pipe bend and t-junction sections.

Finally all the cove skirting can be fixed with bolts countersunk sealed with hot extrudate from an extrusion welding machine.

Wall Fixing Details

At the top of the wall units there may be cast in HDPE profiles where the waterproofing liner will be extrusion welded in order to secure the leading edge of the waterproofing liner. Alternatively the outer liner can pass through the wall roof joint allowing the inner liner to be welded to it by extrusion or fusion welding techniques.

It should be an aim to minimise the vertical fusion weld between geomembrane sheets mainly for aesthetic purposes. Rolls of geomembrane are approximately 5.5 m wide or 7.2 m wide this would represent the lined depth of the service reservoir offering and we would intend to try and deploy the waterproofing liner vertically from an articulated dispenser perhaps from a crane.

We envisage temporarily bolting a number of modified geomembrane installer's mole cramps to some cast in sockets aligned vertically on one precast unit that would represent the starting point to temporarily pin the end of the geomembrane to the wall allowing the crane to pull out the membrane along the wall.

As the process proceeds at regular intervals (to be determined e.g. 1.00 m centres, or less both vertically and horizontally) the geomembrane installer will secure the waterproofing liner to the walls using 'tabs' of the waterproofing liner material (e.g. 150 mm×150 mm) welded vertically to the rear of the geomembrane one side only. Then the flap that has been created can be fastened/bolted/ shotfired to the wall before the other vertical side of the flap is also welded to the back of the geomembrane (if working space permits).

As work on the tabs proceeds in the mid-sheet area of the waterproofing liner it can also be extrusion welded at the top to the cast in profile and at the bottom to the cove skirting detail.

Alternatives to this process may exist but do need further investigation and testing:

i. Clip together discs for 'temporarily' clipping membrane to soffits of tunnels. Increasing the recommended number of these discs per m2 and the fact they are installed on a wall not a soffit may enable their permanent installation on site.
ii. Velcro discs for 'temporary' securing membrane in tunnels. Again increasing the recommended number may allow these to be relied upon permanently with sufficient testing.
iii. Casting in 150×150 tabs of studded cast-in types of liner then 'gluing' the back of the wall waterproofing liner to it as it deploys may be an option but again this would require some testing to look at the sort of strength that could be achieved with this method.
iv. Casting in 150 mm long 'tabs' of HDPE casting profile may also be an option fixed as described in (3) above, again subject to laboratory bond testing.
v. Holes cast though the wall units at regular centres would allow coach bolt fixed through a 'tab' of waterproofing liner and extrusion welded to the rear face of the waterproofing liner would effectively allow the waterproofing liner to be secured from the outside of the tank.

External Waterproofing of Service Reservoir

We envisage laying source electrodes, 1000 g conductive geotextile and waterproofing liner directly to the excavated site before the delivery of the precast units and MIT will be carried out. The waterproofing liner would then be protected by a further layer of 1000 g conductive geotextile before either the precast units are placed directly on it, or concrete blinding is poured on top of it. The waterproofing liner can be tested for integrity after the blinding is poured and in the unlikely event of damage any isolated repairs can still be carried out by breaking out areas of damage repairing and recasting before placing of the precast units.

Once the internal works are complete with all inlet and outlet pipes installed and the precast roof in place, the lower waterproofing liner can be laid across the roof on top of a layer of source electrodes and conductive textile. The lower roof waterproofing liner is then welded to form a continuous sheet before being ballasted and having further sheets of waterproofing liner extension fitted to its perimeter that can the pass down the sides of the tank and be connected to the waterproofing liner beneath the precast units/concrete blinding layer.

Sensors and conductive textile are fitted to the roof area then the primary roof waterproofing liner is fitted over the top secured at the perimeter to the lower waterproofing liner around the perimeter of the tank below the wall joint.

Source electrodes can be fixed to the side walls of the service reservoir before the drainage geocomposite is placed over the waterproofing liner on the roof and all the way down the sides of the reservoir. Then final source electrodes for the roof can then be placed on top of the drainage geocomposite.

The continuous or remote leak monitoring electronics should already be wired commissioned and running before commencement of the backfilling to the sides or roof. This will allow the testing process to occur as the backfilling progresses with alarms occurring in the event of any damage as the work proceeds.

Advantages

Structural Design Requirement

By encasing the structure in smart membranes, the design eliminates normal concrete (reservoir) code requirements for crack-width control, durability and hygiene. The structure may allowably flex more, have less concrete cover and less prefect surface finishes than would pertain to normal structures exposed to earth and stored water.

Precast Slab on Grade

Conventionally, precast concrete slabs are not used in ground slab construction due to the difficulty in preparing a bed of sufficient flatness to eliminate excessive stress as a result of high points and low points in the sub-grade. These would conventionally result a rocking action and indeterminate flexural forces with excessive strains which may compromise durability, hygiene and serviceability.

Although a self-levelling screed is used to top the sub-base for the protection of the geomembrane, moderate differential settlements do not compromise this structure.

The precast concrete slab design consists of two layers of concrete tile strategically overlapped at the joints. This creates a stretcher bond effect to enhance the distribution of load and is so located that the internal columns land centrally on the upper units and never on their joints. This design feature protects the membrane beneath the column and ensures the proper distribution of load to the substrate.

Essentially the overlapping tile design eliminates differential shear forces either side of the lower joint lines, which would otherwise result in differential settlement capable of damaging the outer membrane.

Placement of Structural Ties in the Slab on Grade.

By adapting the edges of the precast floor tiles a void is created for the integration of the structural tie grid required to resist water pressure forces at the base of the perimeter wall units. This avoids any compromise to the membrane by their presence and places the tie forces centrally in the floor plate thus avoiding the potential development of eccentric moment.

Waterproofing Component

Although a concrete reservoir, the concrete components have no function in the waterproofing integrity of the system. This is a unique feature eliminating dependence on sealant-bond and concrete properties.

Demountable

Components of an installation may be demounted for use in part, in whole, or as part of larger installations elsewhere.

Adaptable

The system can be easily enlarged (or reduced) to accommodate future demand requirements.

Constructability

The innovation brings less reliance on fair weather during construction.

Thermal Design

The innovation eliminates the requirement for thermal steel design and thermal steel provision as required by the design of large conventional in-situ floor slabs, walls and suspended structures.

Construction Impact

Significantly fewer personnel are required for less time than with normal construction. Significantly fewer traffic movements are required with less dust, noise, disturbance and impact on neighbours.

Transport is optimised by designing elements to realise the load-carrying capabilities of the delivery vehicles.

Export Capabilities

Complete reservoir assemblies are highly transport efficient—for export, disaster relief and overseas infrastructural development projects.

Membrane Continuity

The design includes a cantilever perimeter roof beam device which facilitates proper detailing of the membrane.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A fluid retaining structure having an electronic leak detection and location (ELDL) system, the fluid retaining structure comprising:
    electrically non-conductive inner and outer liners adapted to form electrical isolation layers for the ELDL system; and
    an electrically conductive signal layer located between the inner and outer liners;
    wherein
        the inner and outer liners create an environment, within an interstitial space between the inner and outer liners, that is (a) electrically isolated from an outside of the fluid retaining structure and (b) electrically isolated from an internal environment inside the fluid retaining structure,
        the electrically conductive signal layer is configured to provide structural rigidity to the fluid retaining structure,
        the electrically conductive signal layer is made of a concrete-based material with steel reinforcement; and
        wherein the outer liner is welded to the inner liner such that the outer liner passes through a wall-roof joint of the electrically conductive signal layer.

2. The fluid retaining structure of claim 1, wherein the electrical isolation layers are further adapted to perform fluid retention and ingress prevention functions of the fluid retaining structure.

3. The fluid retaining structure of claim 1, wherein the inner and outer liners are waterproof.

4. The fluid retaining structure of claim 1, wherein:
    the outer liner includes an outer liner floor section; and
    the electrically conductive signal layer includes an electrically conductive signal layer floor section; and the outer liner floor section is located beneath the electrically conductive signal layer floor section.

5. The fluid retaining structure of claim 4, wherein the electrically conductive signal layer of the floor section is constructed of interlocking precast concrete units.

6. The fluid retaining structure of claim 4, wherein:
the outer liner includes outer liner wall sections; and
the outer liner wall sections are continuous with the outer liner floor section.

7. The fluid retaining structure of claim 6, wherein:
the electrically conductive signal layer includes electrically conductive signal layer wall sections; and
the outer liner wall sections are wrapped around the electrically conductive signal layer wall sections.

8. The fluid retaining structure of claim 7, wherein the electrically conductive signal layer wall sections are constructed of steel reinforced concrete.

9. The fluid retaining structure of claim 7, wherein the wall sections and/or the floor sections of the electrically conductive signal layer are electrically isolated from each other.

10. The fluid retaining structure of claim 7, wherein at least one of the electrically conductive signal layer wall sections incorporates lightening cavities.

11. The fluid retaining structure of claim 1, further comprising:
internal column supports; and
cover elements for the internal column supports;
wherein the internal column supports are located inside the cover elements.

12. The fluid retaining structure of claim 11, wherein the cover elements comprise sleeves placed over the column supports.

13. The fluid retaining structure of claim 11, wherein the cover elements are joined to or part of a floor section of the inner liner.

14. The fluid retaining structure of claim 1, which presents only the inner liner to any contents of the fluid retaining structure.

15. The fluid retaining structure of claim 1, further comprising sensors for the ELDL system, wherein the sensors are located between the inner liner and the outer liner.

16. A method of retaining a fluid in a structure with an electronic leak detection and location (ELDL) system, comprising:

providing electrically non-conductive inner and outer liners to act as electrical isolation layers for the ELDL system;
placing an electrically conductive signal layer between the inner and outer liners, the electrically conductive signal layer being configured to provide structural rigidity for the fluid retaining structure; and
retaining the fluid inside the inner liner of the ELDL system,
wherein
the inner and outer liners create an environment, within an interstitial space between the inner and outer liners, that is (a) electrically isolated from the outside of the fluid retaining structure and (b) electrically isolated from an internal environment inside the fluid retaining structure,
the electronically conductive signal layer is made of a concrete-based material with steel reinforcement; and wherein the outer liner is welded to the inner liner such that the outer liner passes through a wall-roof joint of the electrically conductive signal layer.

17. A kit of parts for a fluid retaining structure having an electronic leak detection and location (ELDL) system, comprising:
electrically non-conductive inner and outer liners adapted for forming electrical isolation layers for the ELDL system; and
an electrically conductive signal layer to place between the inner and outer liners, the electrically conductive signal layer being configured to provide structural rigidity to the fluid retaining structure,
wherein
the inner and outer liners create an environment, within an interstitial space between the inner and outer liners, that is (a) electrically isolated from the outside of the fluid retaining structure and (b) electrically isolated from an internal environment inside the fluid retaining structure,
the electronically conductive signal layer is made of a concrete-based material with steel reinforcement; and wherein the outer liner is welded to the inner liner such that the outer liner passes through a wall-roof joint of the electrically conductive signal layer.

* * * * *